United States Patent Office 3,139,448
Patented June 30, 1964

3,139,448
CHLOROPHENYL SUBSTITUTED DI- AND TRISILAALKANES
Richard Jonathan Hardy, Norton-on-Tees, England, and James McAllan Cormack Thompson, West Kilbride, Scotland, assignors to Imperial Chemical Industries Limited, Millbank, London, England, a corporation of Great Britain
No Drawing. Filed Oct. 31, 1962, Ser. No. 234,514
Claims priority, application Great Britain Oct. 31, 1961
3 Claims. (Cl. 260—448.2)

The present invention relates to new organosilicon compounds and to methods of their preparation.

According to the present invention there is provided a chemical compound of formula,

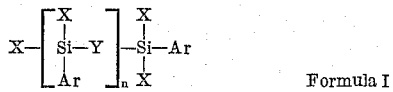
Formula I in which $n$ is an integer, Y is a divalent hydrocarbon or substituted hydrocarbon group, Ar is an unsubstituted or substituted aryl group subject to the condition that at least one of the aryl groups is substituted and X is a hydrogen atom or a hydrocarbon or substituted hydrocarbon group.

Conveniently $n$ is one or two.

In any compound of the present invention the groups X may be the same or different. For example, the groups represented by X may all be alkyl groups, for example lower alkyl groups, that is, alkyl groups containing less than 6 carbon atoms such as methyl, ethyl, propyl or isopropyl. Suitable substituents in the group X may, when X is a hydrocarbon group, include all substituents substantially inert towards a Grignard reagent such as ethers or thio-ether groups.

The substituted aryl group represented by Ar may be for example a substituted phenyl or naphthyl group. Preferably Ar is a substituted phenyl group. The substituent in the group Ar is preferably a difficultly replaceable halogen and is more preferably chlorine. One or more substituents may be present in the group Ar. Thus, for example, group Ar may be para-chlorophenyl or 2,3,5,6-tetrachlorophenyl.

The group Y may, for example, be an alkylene, cycloalkylene, or phenylene group which may be substituted or unsubstituted. Substituents in the group Y may be difficultly replaceable groups such as fluorine. Conveniently Y is an unsubstituted methylene group.

As examples of compounds of the present invention there may be mentioned 1-(para-chlorophenyl)-3-phenyl tetramethyl disilmethylene and 2,3,5,6-tetrachlorophenyl-phenyl-tetramethyl disilmethylene, and 3-(2,3,5,6-tetrachlorophenyl) - 1,1,3,5,5 - pentamethyl - 1,5 - diphenyl-1,3,5-trisila-n-pentane.

The novel compounds of the present invention have a number of useful applications, for instance they may be utilized as lubricants, impregnants or hydraulic fluids, damping fluids or diffusion pump fluids.

According to a further feature of the present invention there is provided a process for preparing compounds of Formula I which comprises reacting in a suitable solvent a compound of formula

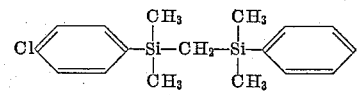

with a compound of formula

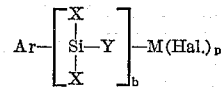

in which $b$ is 0 in which event $a$ must be an integer, or $b$ is an integer in which event $a$ may be 0 or an integer, Hal. is a halogen atom, Y is a divalent hydrocarbon or substituted hydrocarbon group, X is a hydrogen atom or a hydrocarbon or substituted hydrocarbon group, M is a metal, $p$ is one less than the valency of the metal, M and Ar is an aryl group at least one of which aryl groups is substituted. It is to be noted that $a+b$ is equal to $n$.

Conveniently M is a di-valent metal such as for example magnesium, zinc or cadmium.

Suitable solvents include ethers such as diethyl ether or hydrocarbons such as for example xylene.

EXAMPLE 1

*Preparation of 1-(p-Chlorophenyl)-3-Phenyl Tetramethyl Disilmethylene*

The Grignard reagent phenyl dimethyl silyl methyl magnesium chloride (0.3 mole) in diethyl ether (350 ml.) was added to a solution of p-chlorophenyl dimethyl chlorosilane (0.3 mole) in a mixture of diethyl ether and xylene.

The mixture after refluxing for 24 hours, was cooled and then hydrolysed with dilute hydrochloric acid. The mixture separated into an aqueous and an organic layer which were separated in the usual manner. The organic layer after removal of the solvents was fractionally distilled under a pressure of 0.2 mm. Hg to give 76.7 gms. (corresponding to an 80% yield) of impure 1-(p-chlorophenyl)-3-tetramethyl disilmethylene.

This crude product was washed first with dilute hydrochloric acid and then with aqueous sodium hydroxide and finally redistilled at a temperature of 112–114° C. under reduced pressure (0.1 mm. Hg) to give a colourless, odourless, fairly mobile oil which analysis showed to be the p-chloro derivative.

| Chemical Analysis | Percent C | Percent H | Percent Cl | Percent Si |
|---|---|---|---|---|
| Found | 61.8 | 6.9 | 13.2 | 17.6 |
| $C_{17}H_{23}ClSi_2$ requires | 64.0 | 7.2 | 11.2 | 17.7 |

The compound $C_{17}H_{23}ClSi_2$ has the following structure

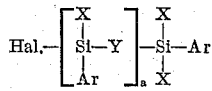

EXAMPLE 2

*Preparation of 1-(2,3,5,6)-Tetrachlorophenyl-3-Phenyl Tetramethyl Disilmethylene and the Trisilmethylene Derivative 3 - (2,3,5,6 - Tetrachlorophenyl) - 1,1,3,5,5-Pentamethyl-1,5-Diphenyl, 1,3,5-Trisila-n-Pentane*

50 gms. of a mixture comprising largely 2,3,5,6-tetrachloro phenyl dimethyl chlorosilane, but also some 2,3,5,6-tetrachlorophenyl methyl dichlorosilane, was refluxed over a period of three days with phenyl dimethyl silyl methyl magnesium chloride in xylene and the mixture was then hydrolysed with dilute hydrochloric acid.

The hydrolysed mixture separated into two layers: an aqueous layer and an organic layer which were separated in the usual manner. The organic layer after removal of the solvents was fractionally distilled to yield two products: 33.8 gms. of a lower boiling fraction (160°–164° C./0.15 mm. Hg) of 1-(2,3,5,6)-tetrachlorophenyl-3-phenyl tetramethyl disilmethylene was obtained.

| Chemical Analysis | Percent C | Percent H | Percent Cl | Percent Si |
|---|---|---|---|---|
| Found | 48.5 | 4.8 | 32.5 | 12.0 |
| $C_{17}H_{20}Cl_4Si_2$ requires | 48.3 | 4.7 | 33.3 | 13.3 |

6 gms. of a trisilmethylene derivative 3-(2,3,5,6-tetrachlorophenyl) - 1,1,3,5,5 - pentamethyl - 1,5 diphenyl-1,3,5 trisila-n-pentane

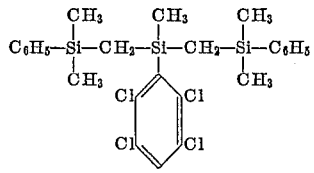

was also obtained as a higher boiling fraction (211°–218° C./0.2 mm. Hg).

| Chemical Analysis | Percent C | Percent H | Percent Cl | Percent Si |
|---|---|---|---|---|
| Found | 53.4 | 5.3 | 24.4 | 14.0 |
| $C_{25}H_{30}Cl_4Si_3$ requires | 54.0 | 5.4 | 25.5 | 15.1 |

We claim:
1. 1-(2,3,5,6)-tetrachlorophenyl-3-phenyl tetramethyl disilmethylene.
2. 3 - (2,3,5,6 - tetrachlorophenyl - 1,1,3,5,5 - pentamethyl-1,5-diphenyl-1,3,5-trisila-n-pentane.
3. 1-(para-chlorophenyl)-3-phenyl tetramethyl disilmethylene.

References Cited in the file of this patent
UNITED STATES PATENTS

| Re. 23,270 | Clark | Sept. 26, 1950 |
| 2,507,518 | Goodwin | May 16, 1950 |
| 2,507,551 | Sommer | May 16, 1950 |
| 3,099,640 | Hay | July 30, 1963 |